United States Patent
Della Pietra et al.

(10) Patent No.: US 7,051,646 B2
(45) Date of Patent: May 30, 2006

(54) SYSTEM FOR TRANSFERRING INDIVIDUAL COFFEE PACKAGES FROM A CONTAINER TO THE EXTRACTION CHAMBER OF A MACHINE FOR MAKING ESPRESSO COFFEE

(75) Inventors: Bruno Della Pietra, Trieste (IT); Gianfranco Racchi, Trieste (IT); Pierpaolo Racchi, Trieste (IT); Furio Suggi Liverani, Trieste (IT)

(73) Assignee: Illycaffe' S.p.A., Trieste (IT)

( * ) Notice: Subject to any disclaimer, the term of this patent is extended or adjusted under 35 U.S.C. 154(b) by 0 days.

(21) Appl. No.: 10/490,281

(22) PCT Filed: Sep. 10, 2002

(86) PCT No.: PCT/EP02/10114

§ 371 (c)(1),
(2), (4) Date: Oct. 13, 2004

(87) PCT Pub. No.: WO03/026467

PCT Pub. Date: Apr. 3, 2003

(65) Prior Publication Data

US 2005/0061158 A1    Mar. 24, 2005

(30) Foreign Application Priority Data

Sep. 21, 2001  (IT) .............................. MI01A1974

(51) Int. Cl.
*A47J 31/34* (2006.01)

(52) U.S. Cl. ........................ 99/280; 99/289 R; 99/290; 99/295; 99/302 P

(58) Field of Classification Search .......... 99/279–283, 99/495, 485, 287–295, 300–303, 307–310, 99/313, 516, 315; 221/209, 277, 150 A, 221/87, 121

See application file for complete search history.

(56) References Cited

U.S. PATENT DOCUMENTS 2,243,895 A * 6/1941 Brown ...................... 99/289 R (Continued)

FOREIGN PATENT DOCUMENTS

EP     1 002 490    5/2000

(Continued)

*Primary Examiner*—Timothy F. Simone
(74) *Attorney, Agent, or Firm*—Young & Thompson

(57) ABSTRACT

In the area of beverage distributors, document FR 1 564 088 is known that discloses an automatic dispenser device suitable for preparing beverages of various kind. The beverages may be hot or cold ones obtained from liquid or concentrated products, solid and powderly products contained in hermetically closed capsules of troncoconical shape, in turn contained, stacked one on the top of the other, in certain tubular containes. The dispenser is provided with a number of groups of containers each of which contains a certain number of capsules of a certain product so that the dispenser may be activated by a user for delivering a desired beverage. The dispenser is such that the content of any capsule falls into a mixing chamber where it mixes with hot or cold liquid poured therein and is certainly not adapted to brew an aspresso coffee. As to the structure and function of the distributor, each group of containers is positioned on a rotating drum provided with a passage for a capsule and mechanical means provide to transfer a capsule in the direction of the mixing chamber, to cut the head of a capsule and to make the capsule turn over in order its content to fall into said chamber. This dispenser works sealed capsules loaded into open containers.

15 Claims, 11 Drawing Sheets

U.S. PATENT DOCUMENTS

| | | | | |
|---|---|---|---|---|
| 3,155,212 A | * | 11/1964 | Hines | 194/242 |
| 4,829,889 A | * | 5/1989 | Takeuchi et al. | 99/289 P |
| 5,134,924 A | * | 8/1992 | Vicker | 99/280 |
| 5,772,072 A | * | 6/1998 | Prescott et al. | 221/121 |
| 6,240,832 B1 | | 6/2001 | Schmed et al. | |

FOREIGN PATENT DOCUMENTS

| | | |
|---|---|---|
| EP | 1 089 240 | 4/2001 |
| FR | 1 564 088 | 4/1969 |
| FR | 2 160 635 | 6/1973 |
| HU | 214745 | 2/1997 |

* cited by examiner

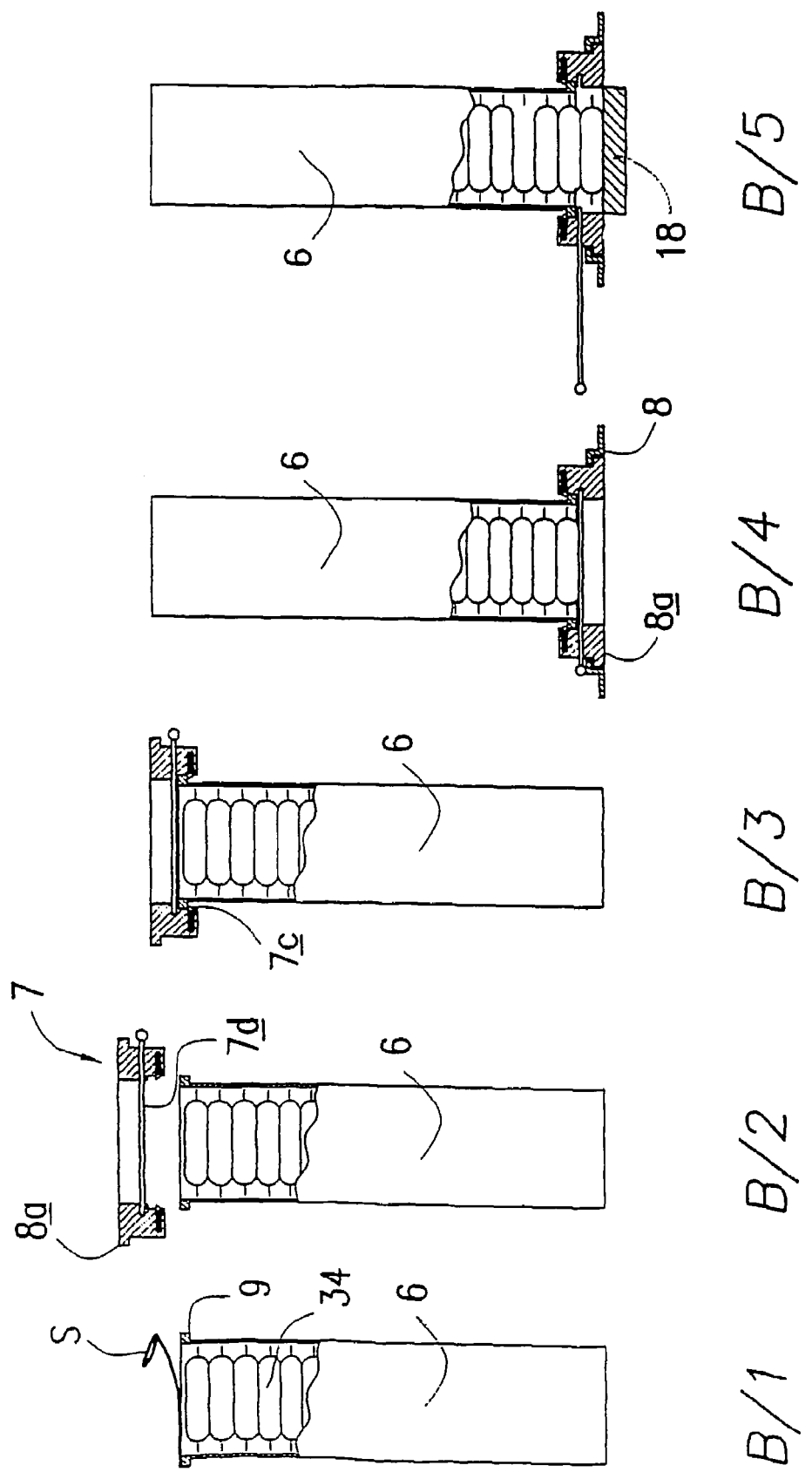

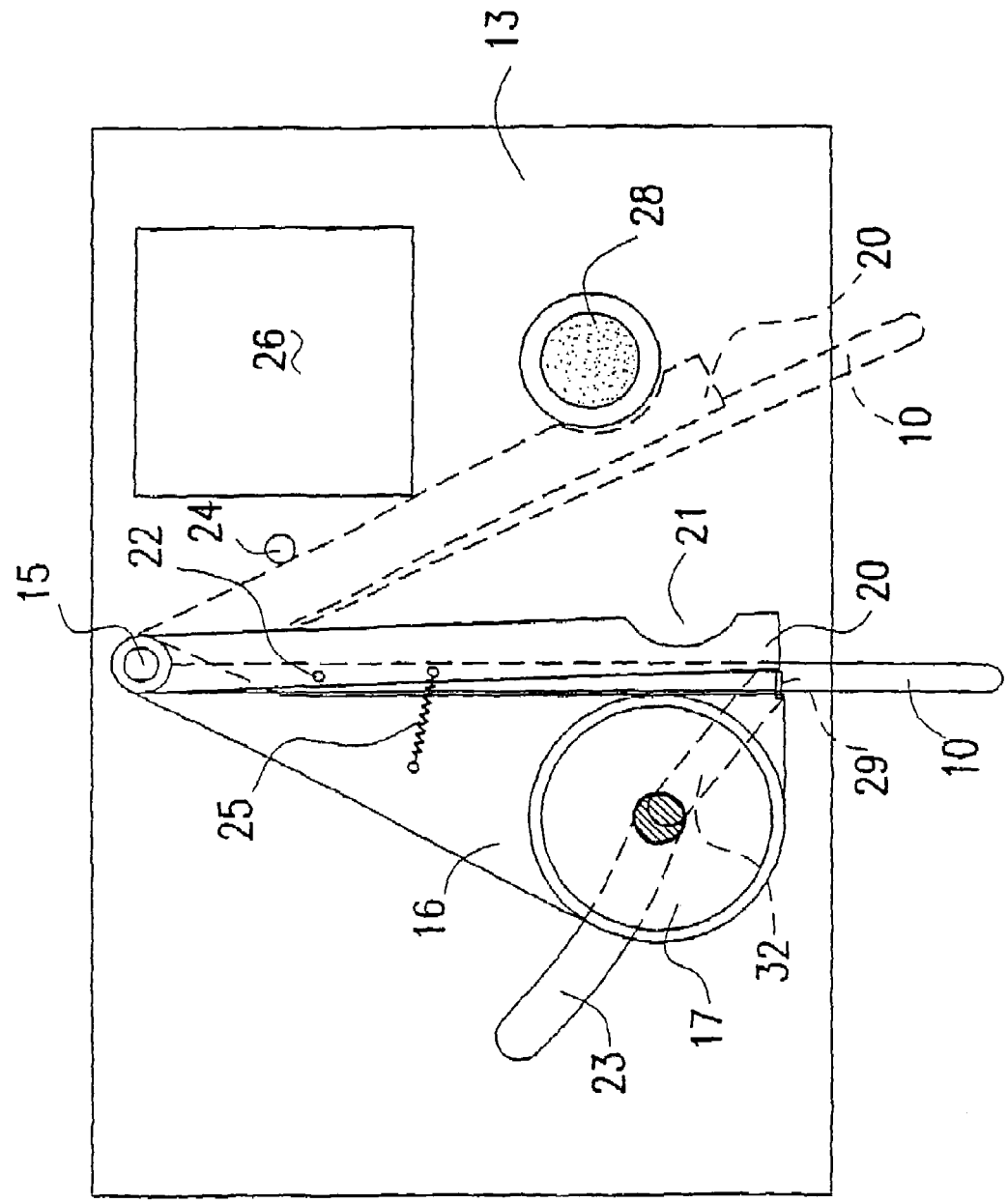

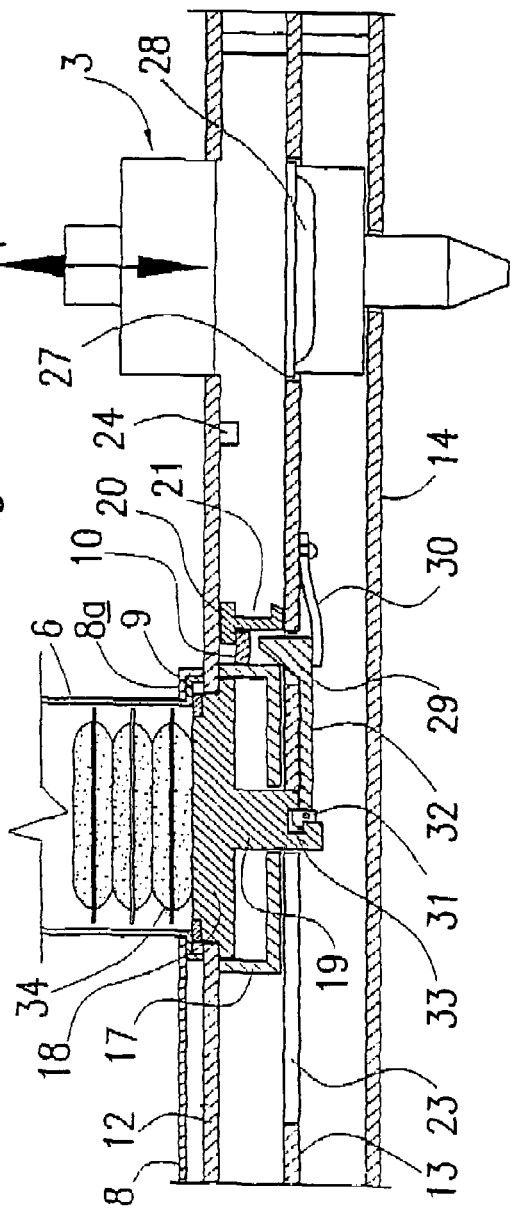
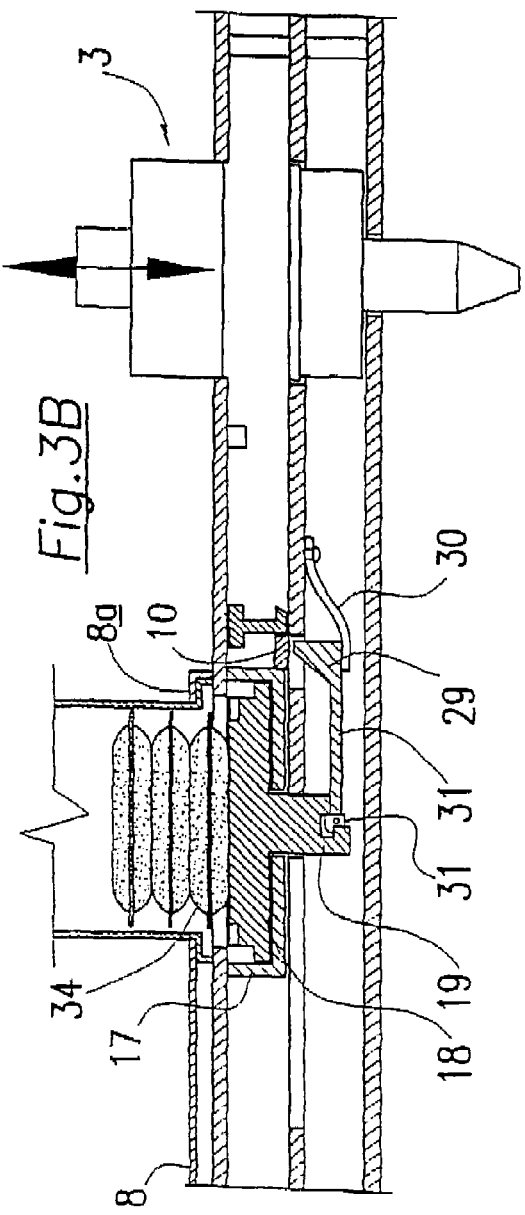

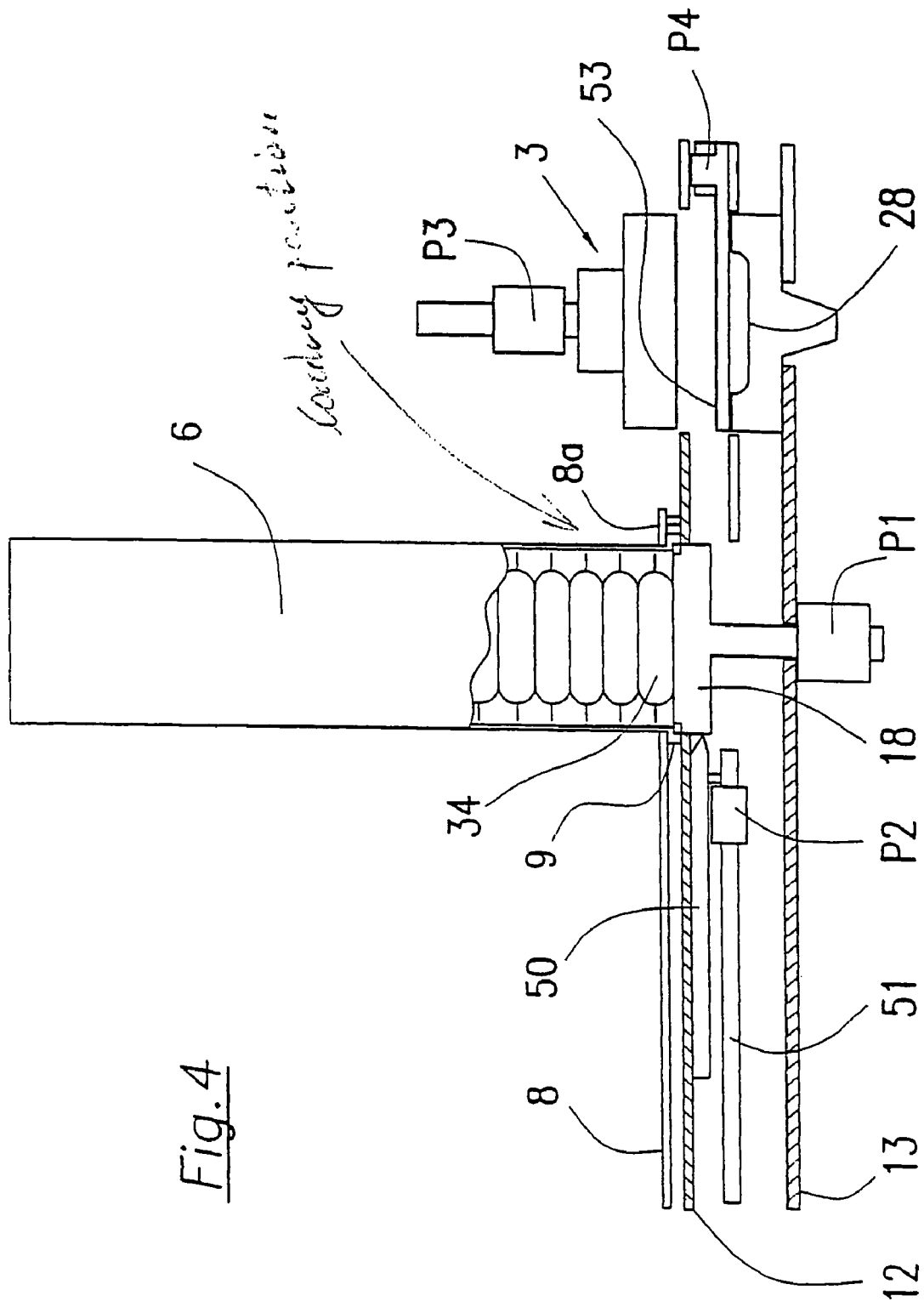

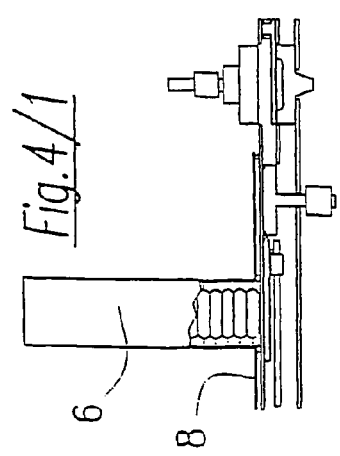
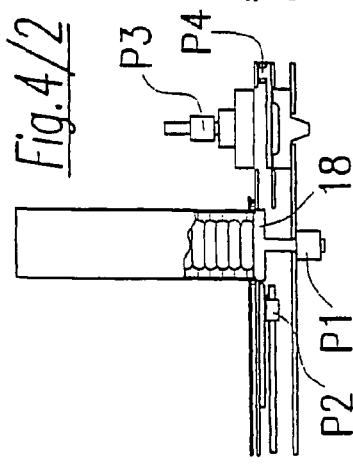
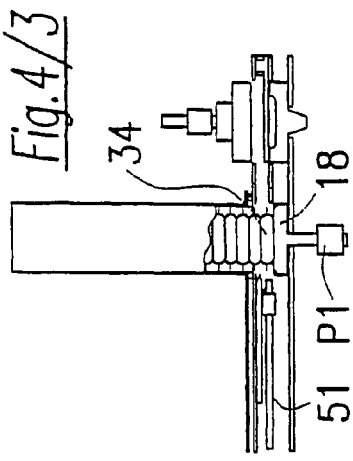
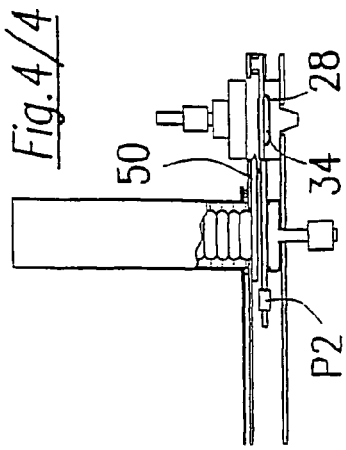
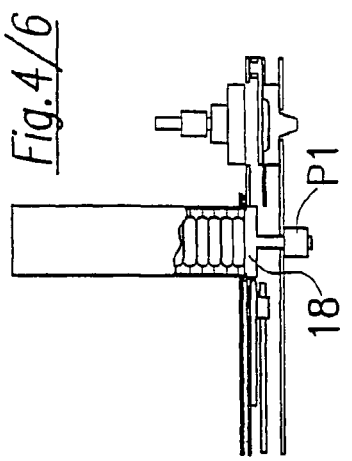
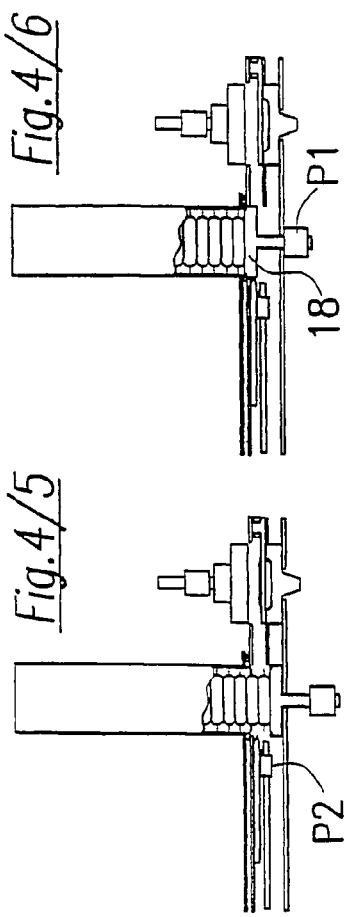
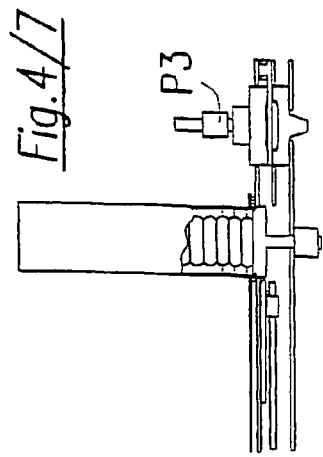
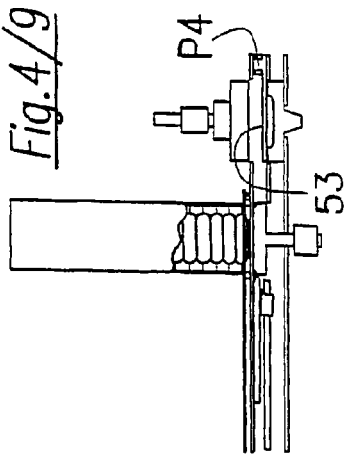
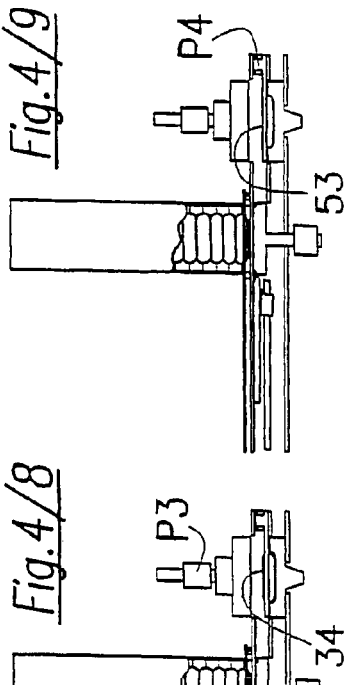

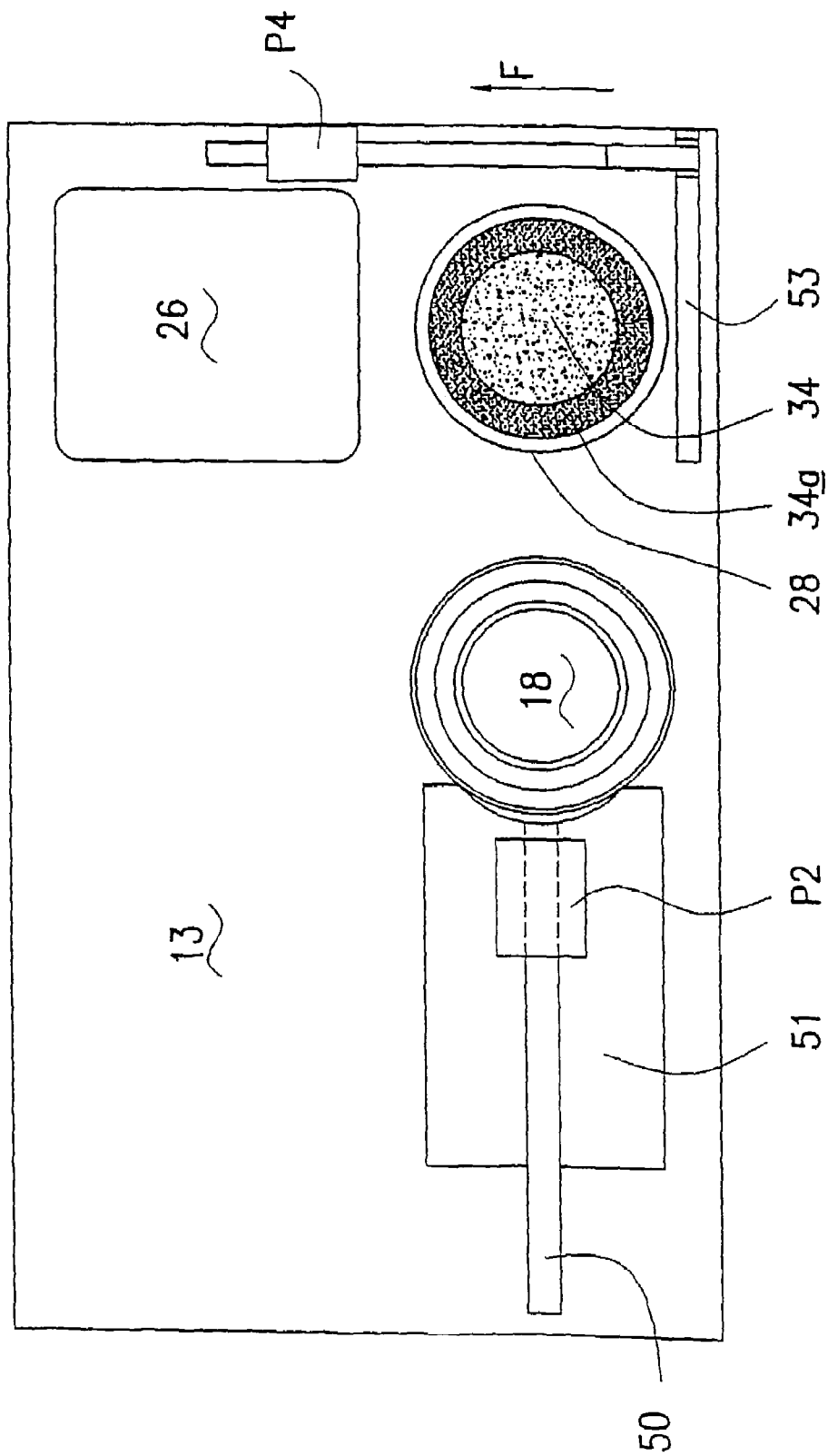

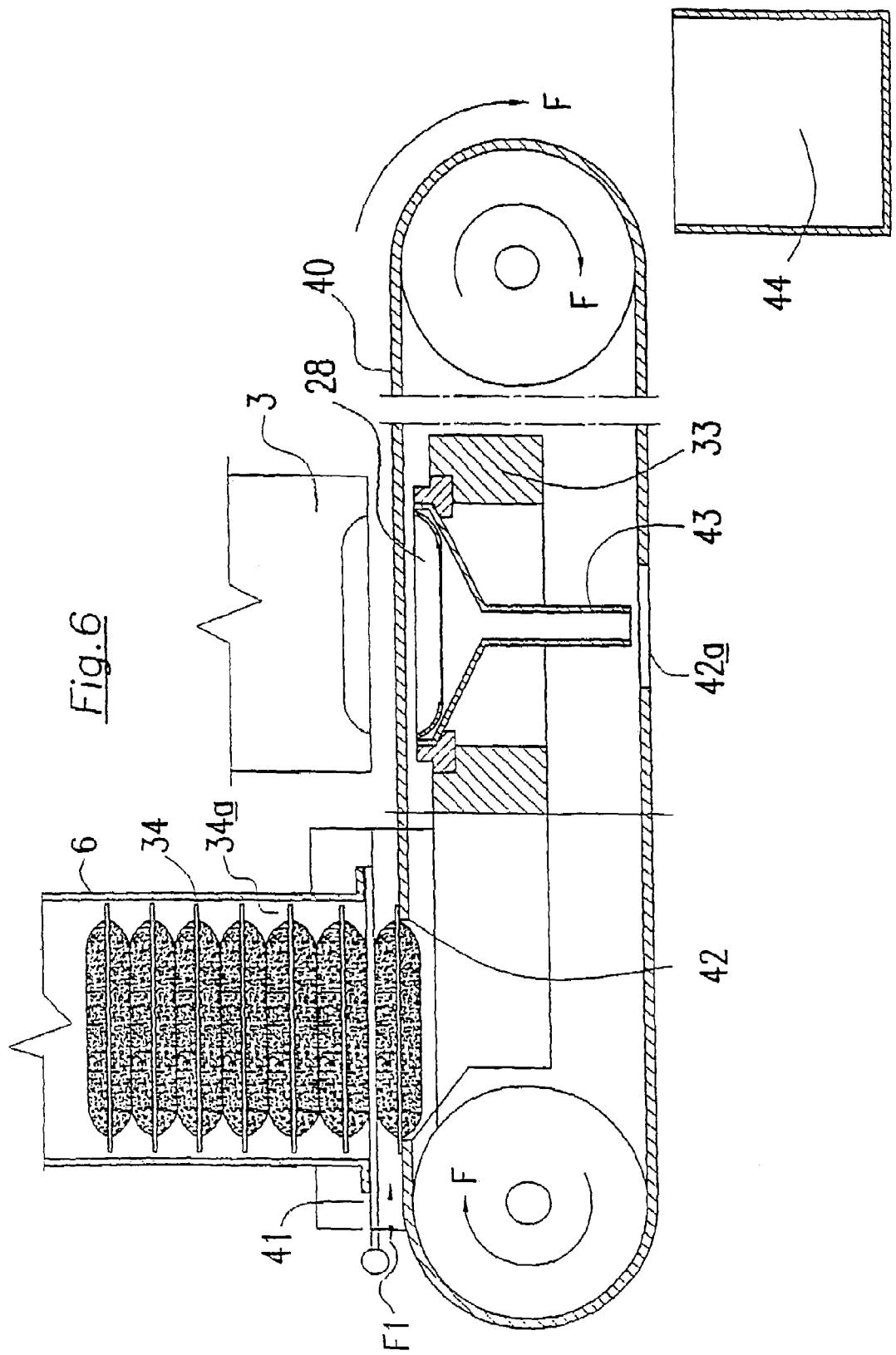

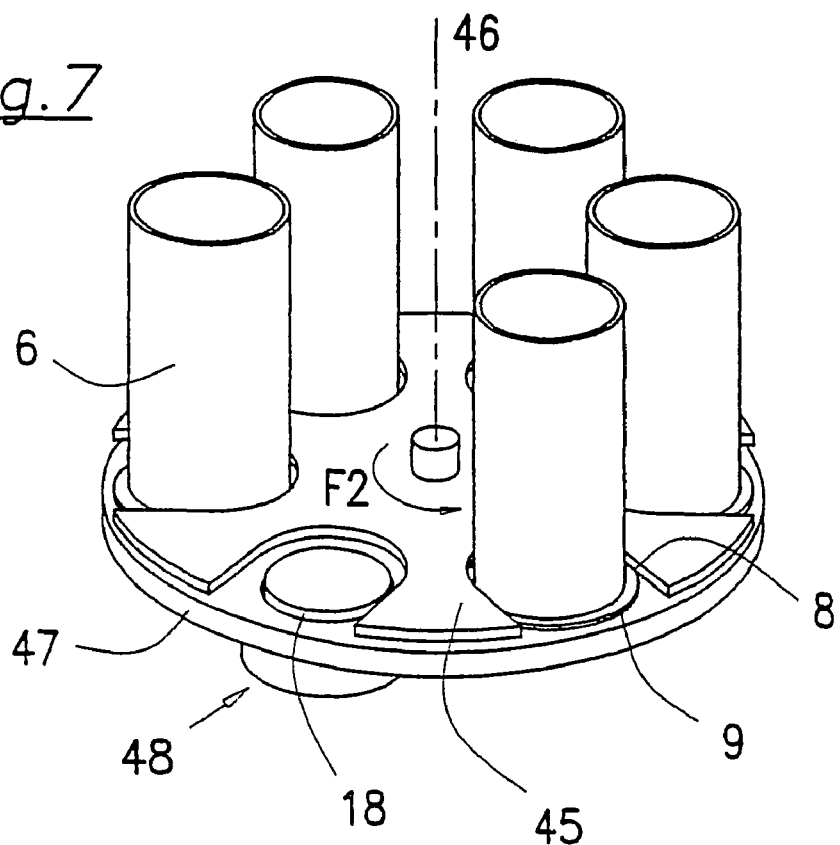
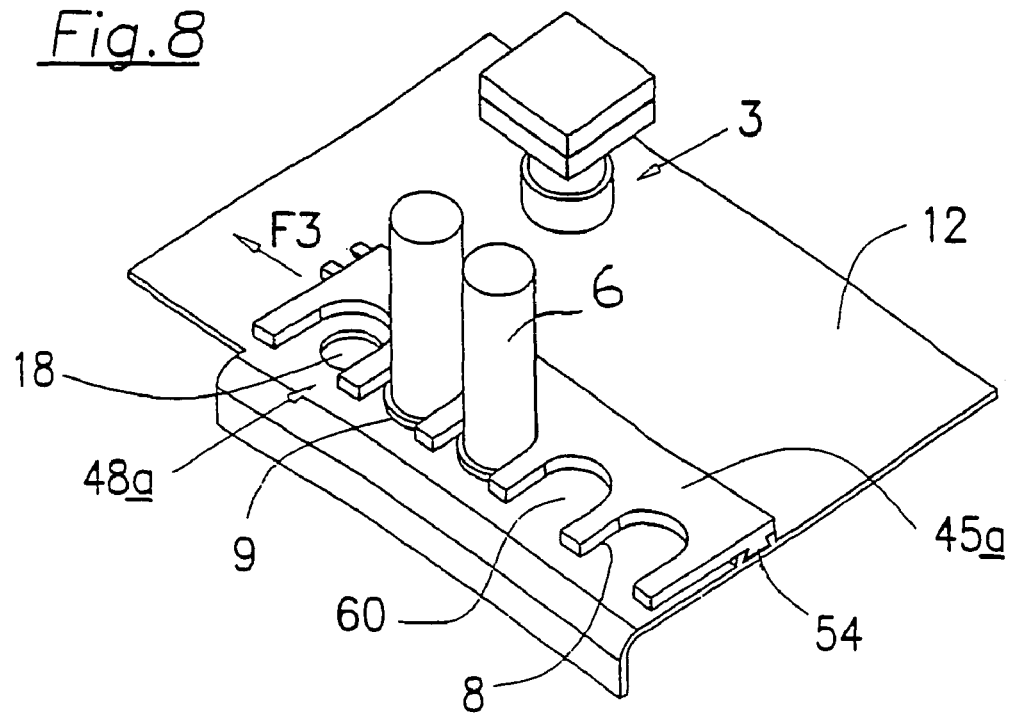

SYSTEM FOR TRANSFERRING INDIVIDUAL COFFEE PACKAGES FROM A CONTAINER TO THE EXTRACTION CHAMBER OF A MACHINE FOR MAKING ESPRESSO COFFEE

BACKGROUND OF THE INVENTION

The present invention concerns a system for transferring individual coffee packages from a container to an extraction chamber of a machine for making espresso coffee.

The invention solves the problem of having to handle individual coffee packages when these are transferred from a container to the extraction chamber, the said container being sealed at the factory and then opened just before the packages are to be used. The invention also comes to grips with the problem of keeping these packages in the open container as far as possible protected against the air until each package actually becomes transferred into the extraction chamber of the coffee machine.

DESCRIPTION OF THE RELATED ART

It is known that the term "espresso coffee" refers to coffee intended to be drunk immediately after having been prepared by means of the percolation of hot water under pressure and that the term 'extraction chamber' refers to the part of the coffee machine in which this percolation is effected either through an individual coffee package or through a dose of loose coffee not contained in a package.

The term "individual coffee package" refers to a package that in common usage is known as "pod", "capsule", "cartridge" or other commercial terms. These packages contain a dose of roasted and ground coffee sufficient to provide one or more cups of coffee, though the number of cups that such a package may produce is irrelevant for the purposes of the present invention.

The pod is a dose of coffee compressed between two layers of paper through which water can readily percolate or some other equivalent material and as a general rule assumes the form of a disc—dimensions: thickness of the order of 10 mm and diameter in the range between 35 mm and 50 mm—surrounded by a crown or border consisting of the two layers of paper welded together, where the said crown or border may likewise be circular or polygonal. The pod is thus a package that has to be protected against the attack by the air from the moment it is produced right through to the moment of use.

The capsule and the cartridge are doses of coffee contained in a wrapping, generally having the shape of a truncated pyramid, a cylinder or a disc, and generally made of plastic, aluminium foil or multi-layer material, and therefore generally well protected against attack by air, after the wrapping has been enclosed in an appropriate extraction chamber, it is punctured above and below, so that the hot water will be able to percolate through its coffee contents. As compared with pods, capsules and cartridges therefore have less need for being protected against attack, but it may nevertheless be desirable to assure them a long period of conservation by means of the system constituting the subject of the invention.

For simplicity, in the description that follows each individual dose of coffee will be conventionally referred to as a pod.

Two types of espresso coffee machines operating with pods are at present known, namely a type in which each pod is manually transferred into the fraction chamber after having opened a container that is generally sealed and a type in which each pod, comprised on a belt that carries a plurality of pods and conserved in a sealed container that is opened only at the moment of use, is transferred into the extraction chamber by means of mechanical devices.

In neither case, however, is it possible to avoid the pod having to be handled by an operator and this means that all the pods of a container come into contact with the environmental air and undergo ageing. In the first case, the user will have to remove the sealing closure, open the container cover, pick up the pod to be used in the machine and then replace the cover. In the second case the handling occurs when the pod belt is loaded into the machine. In this phase the operator needs a minimum of technical knowledge of the machine and also a certain skill. In the second case there is also the problem that the organoleptic properties of the coffee will rapidly deteriorate as the pods come closer to the device that heats the percolation water.

SUMMARY OF THE INVENTION

With a view to obviating all the aforesaid drawbacks, the invention consist of a system for transferring the pod from the container to the extraction chamber associated with an espresso coffee machine and comprising:

at least one tubular container that may be either rigid or semi-rigid and contains a load of pods stacked one on top of the other and which, as soon as it has been deprived of the hermetic closure element that closes its mouth, is attached to the machine in such a way that its own engagement means engage with the corresponding receiving means associated with the machine in a loading position adjacent to the extraction chamber, the said container performs the twofold function of container and loader, since—apart from containing a group of pods—it also performs the function of "feeding" the machine with the necessary pods; for the sake of simplicity, however, we shall continue to describe this part solely as 'container'.

a mobile closure means that can be associated with the machine to perform controlled displacements from a position in which the mouth of the container is closed (closure position) to a position in which the said mouth is open (open position), so that the bottommost pod in the container may drop out of it, after which the mouth of the container is immediately closed again by the mobile In the area of beverage distributors, document FR 1 564 088 is known that discloses an automatic dispenser device suitable for preparing beverages of various kind. The beverages may be hot or cold ones obtained from liquid or concentrate products, solid and powderly products contained in hermetically closed capsules of troncoconical shape, in turn contained, stacked one on top of the other, in certain tubular containers. The dispenser is provided with a number of groups of containers each of which contains a certain number of capsules of a certain product so that the dispenser may be activated by a user for delivering a desired beverage. The dispenser is such that the content of any capsule falls into a mixing chamber where it mixes with hot or cold liquid poured therein and is certainly not adapted to brew an espresso coffee. As to the structure and function of the distributor, each group of containers is positioned on a rotating drum provided with a passage for a capsule and mechanical means provide to transfer a capsule in the direction of the mixing chamber, to cut the head of the capsule and to make the capsule turn over in order its content to fill into said chamber. This dispenser works sealed capsules loaded into open containers.

Closure Means;
   an opening in the machine at the loading position to enable the bottommost pod to pass from the container into a transfer means below it when the mobile closure element is in the open position;
   a transfer means to carry the pod that has dropped onto it from the container ill the loading position to the extraction chamber (the position of the transfer means when it is below the mouth of the container in the loading position will henceforth be likewise described as loading position);
   control means to activate in sequence the aforesaid mobile closure means and the transfer means and means for performing the phases of closing the extraction chamber after the pod bas been transferred into it, the return of the said mobile closure means to its rest position, the pump that pumps the water to the heating device and the exaction chamber, the percolation of the coffee, the opening of the extraction chamber, the expulsion of the exhausted pod, so that the system may be ready to perform, when so commanded by the user, the same sequence of operations on the next pod released from the container.

When referred to the container, the term 'tubular' is to be generally understood as meaning 'cylindrical and hollow', though not solely so; the term. 'tubular' is to be understood as referring to an oblong and hollow container having an internal cross-section suitable for containing a certain number of pods stacked one on top of the other and having their circular or polygonal outer perimeter defined by the shape of the crown consisting of the two layers of paper welded together. This container is made of a material suitable for containing food, i.e. capable—either on its own account or following an appropriate surface treatment—of isolating the contents from the penetration of outside air and humidity and, further, minimizing the transmission of heat through it Preferably:
   The transfer means will comprise parts that will cause the mobile closure means to move away from the mouth of the container, the transfer of a pod into the extraction chamber and the return of the said parts to their respective rest positions, the mobile closure means is essentially a 'plug', the part that transfers a pod into the extraction chamber will henceforth be called positioning means and will generally be an arm capable of carrying out an angular or rectilinear movement, the plug and the arm being controlled by a single motor means or by two respective motor means that could be manual, electromechanical, hydraulic or pneumatic.
   Preferably again the mobile closure means will be a retractable plug capable of plugging the mouth of the container placed in the loading position and controlled in such a manner as to cause it to retract vertically and then to become displaced sideways and thus to permit the operation of the positioning means that transfers the pod into the extraction chamber.
   Alternatively, the positioning means will be an endless belt revolving in the direction that goes from the loading position to the extraction chamber and provided with a large number of seatings, all equidistant from each other, each of the seating being capable of receiving a pod when a controlled movement brings the seating, step by step, under the mobile closure means, so that a pod can be received in the seating and then transported to the extraction chamber. The belt also comprises appropriately spaced openings to permit the passage across the belt of the coffee eventually to be delivered from the spout of the machine.
   Alternatively again, the system will comprise a disc that is made to rotate in an intermittent manner by a motor organ and carries, equally spaced along its periphery, a number of rigid tubular containers, each of which contains a load of pods stacked one on top of the other and is provided with engagement means that, after the container has been deprived of its hermetic closure element, can be made to engage with corresponding engagement means provided on the disc, so that the containers can be brought, one after the other, into a loading position adjacent to the extraction chamber, in this position, every time the consumer gives an appropriate command, there are activated the transfer means to carry the pods, one at a time, to the filter. A sensor or counter informs the control organ when the container in the loading position has consigned its last pod, whereupon the motor organ causes the disc to perform a rotation to bring the next container full of pods into the loading position.

The advantages of the system are as follows:
   the pods to be loaded in a machine are contained in at least one sealed tubular container, which may be designed to contain any desired number of pods, for example, a dozen for a family machine or a small office or thirty-six for an automatic machine in service in larger environments or, again, there may be a plurality of such containers to accommodate a much larger number of pods; the loading of the pods is performed by simply removing the sealing closure of the container and introducing its engagement means into the guides on the machine;
   it avoids the operator having to handle the product or having to touch it in any way, and this irrespective of whether the machine is manual or automatic,
   the container remains closed even when, after the removal of its seal, it has been loaded into the machine;
   all the pods in the container introduced into the machine remain well away from the sources of beat and do not therefore suffer deterioration of their organoleptic properties;
   each exhausted pod is automatically removed after the extraction of the coffee and this is of advantage even in a manually operated machine, because in the known machines the pod often remains forgotten in the extraction chamber, where it will tend to adhere to the gasket, so that subsequent attempts to remove it may tear the paper and cause spillage of the coffee grounds;
   the operations of cleaning the extraction chamber, together with a possible filter and filter carrier and, quite generally, the parts of the chamber in contact with the extracted coffee are very simple, which is very different from what happens in the known machines, where the entire coffee extraction unit has to be dismantled.

BRIEF DESCRIPTION OF THE DRAWINGS

The invention will now be described in greater detail by means of some embodiment examples and reference to the attached drawings, where:
FIG. 1B shows a sequence of elevation views,
FIG. 2 shows a first partial plan view,
FIGS. 3A and 3B show further elevations (which appear partially sectioned),
FIG. 4 is another elevation view, FIG. 4/1–4/9 show a sequence of elevation views illustrating successive operating phases,
FIG. 5 shows a plan view,
FIG. 6 shows another elevation view,
FIG. 7 shows a perspective view,
and FIG. 8 shows another perspective view.

DESCRIPTION OF THE PREFERRED EMBODIMENTS

Figure 1:
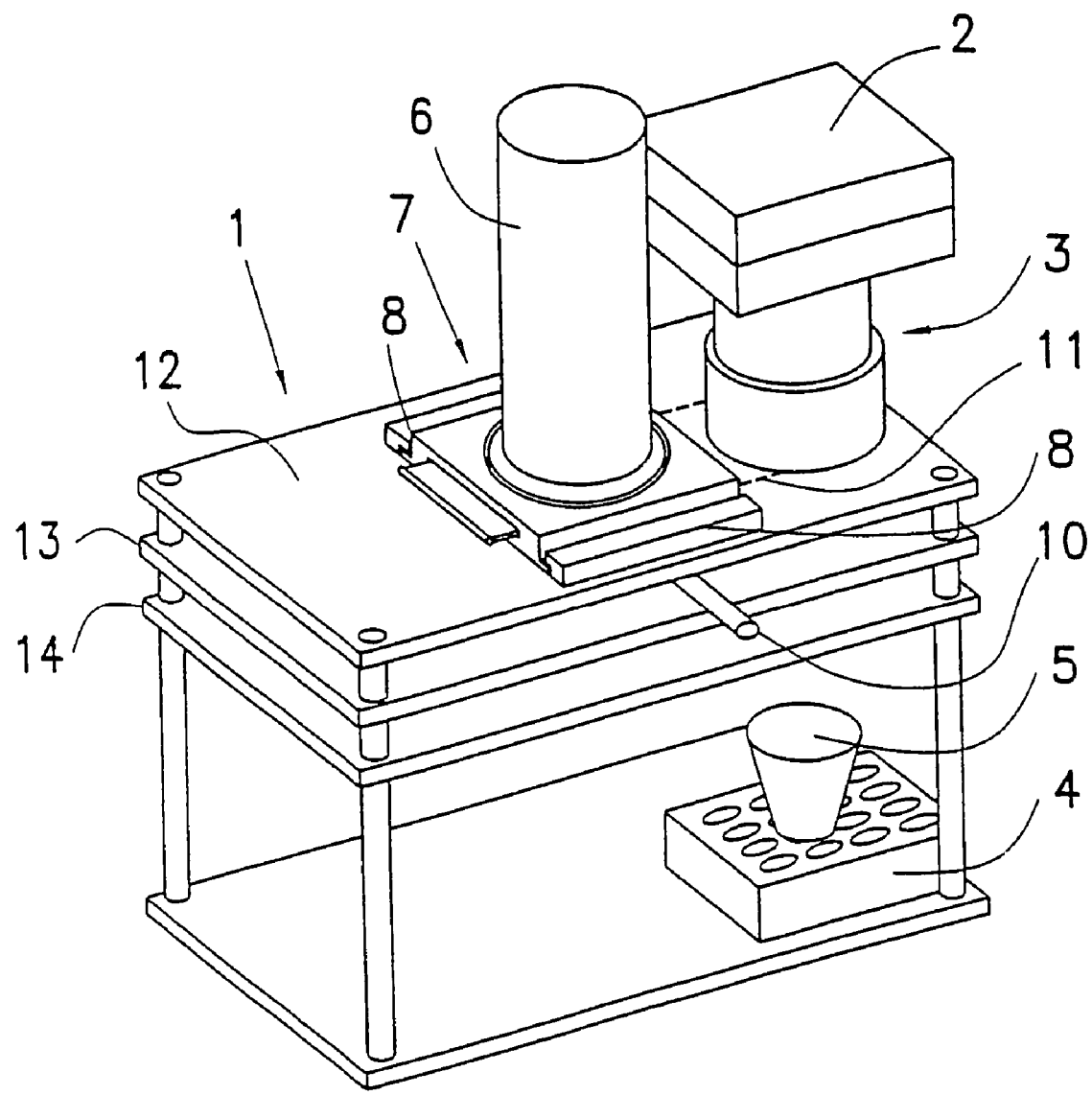
FIG. 1 shows a first perspective view.

FIG. 1 shows the structure 1 of a coffee machine that serves as support for conventional means and means in accordance with the invention, the said structure consisting of an upper plate 12, an intermediate plate 13 and a lower plate 14; a conventional heat exchanger 2 is capable of assuming the instantaneous heating of the water contained in a tank not shown on the drawing; 3 is a conventional chamber for extracting coffee from a coffee pod; 4 is a conventional sorting plane on which to rest a coffee cup 5 complete with a drip pan below the gratings A rigid cylindrical and tubular container 6 contains 36 round coffee pods stacked one on top of the other and, having just been deprived of the sealing closure applied to its mouth, is here show engaged with an adapter means 7 fixed to the machine by means of two parallel guides 8 in a loading position adjacent to the extraction chamber. The functioning of the system for transferring the individual pods will now be described in general terms and subsequently described in greater detail by reference to subsequent figures. In the said loading position of the container, mobile beneath the upper plate 12, there is a plug at the end of an arm that is hinged on the intermediate plate 13 below it) the said plug serving to close the mouth of the container and to sustain the bottommost pod inside it; a manual control lever 10 can be moved to the left, thereby causing, at one and the same time, the displacement of the plug and of a means for positioning the pod, where the said means, sliding below the pod still inside the mouth of the container, comes to rest to the left of the loading position and the pod, which in the meantime has dropped from the mouth of the container and has come to rest on the intermediate plate 13; the positioning means engages the pod with the appropriately convex profile of its extremity.

It will readily be understood that the adapter capable of being fixed to the machine is provided with an opening situated in the loading position, so that it can collaborate with the transfer means beneath it. In this solution the operator will hold the adapter with one hand, using the other to grip the container and make it engage with the engagement means provided on the adapter, which he will then mount in its correct position on the upper plate 12.

Figure 1A:
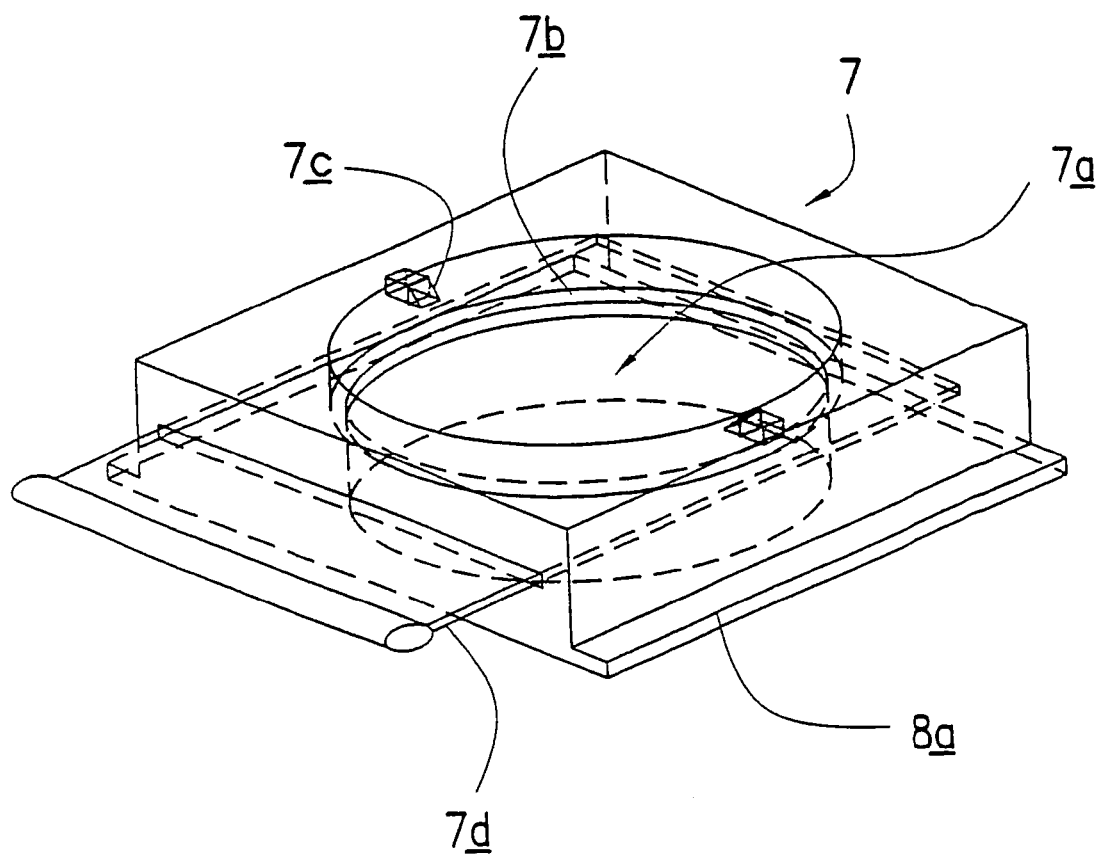
FIG. 1A shows a perspective view of a detail of FIG. 1.

FIG. 1A provides a more detailed view of the adapter 7 with the tabs 8a intended to engage with the guides 8 fixed on the plate 12 and shown in FIG. 1. The circular opening 7a passing through the adapter consists of an upper part and a lower part; the upper part has a larger diameter than the lower part and carries a circular shoulder 7b to sustain the mouth of the container, which is kept in position by the two opposite snap fasteners 7c, and has a second diameter such as to permit pod to pass through it on its way from the container to the extraction chamber, a shutter 7d closes the mouth of the container during the operation of applying the container to the adapter to prevent the pods from dropping out; the sequences of this operation are schematically illustrated by FIG. 1B, where not all the reference numbers identifying the various parts in the component figures have been shown, thus avoiding undue complication of the drawing, and where:

B1 shows a container 6 full of pods 34 held in a vertical position while an operator removes the closure seal S from the container mouth; the latter is surrounded by a radial border 9 sufficiently large to engage with corresponding engagement means;

B2 shows the adapter 7 already described in FIG. 1A brought to bear against the open container mouth 6; the shutter 7d is in its closed position;

B3 shows the adapter 7 applied to the mouth of the container 6; the border 9 of the latter is now kept engaged with the adapter by means of the snap fasteners 7c;

B4 shows the adapter 7 turned upside down and applied to the machine; the tabs 8a of the adapter are engaged in the guides 8; the shutter 7 is still maintained in its closed position;

B5 shows the shutter 7d in its open position, thus permitting the bottommost pod to drop onto the plug 18 of the system in position beneath the container.

Figure 1C:
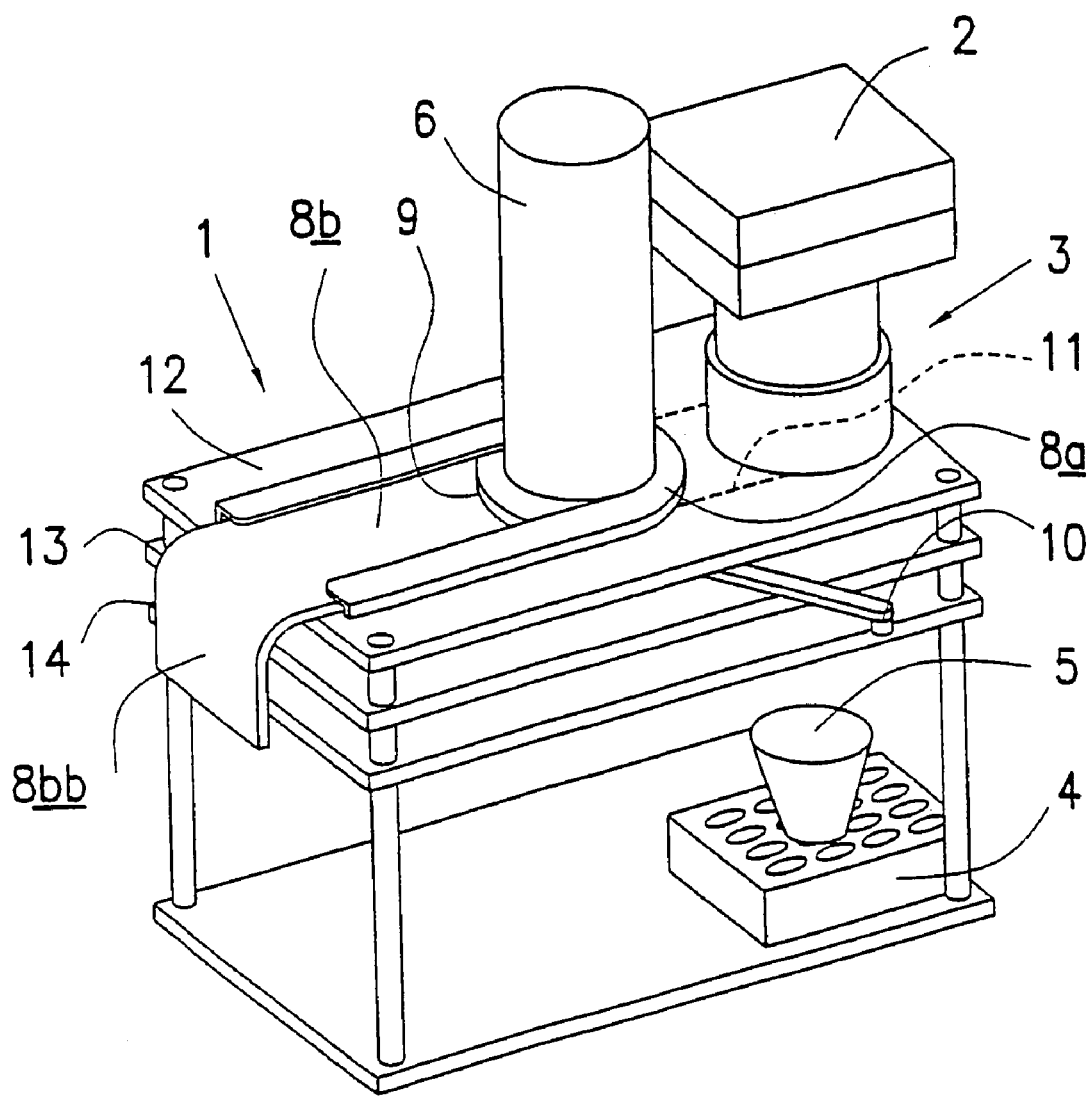
FIG. 1C shows a second perspective view of the invention.

FIG. 1C shows an alternative to the use of the adapter 7 illustrated in FIG. 1; with a view to permitting the container 6 to be applied to the machine, the upper plate of the machine is provided with a pair of parallel guides 8 that combine into a semicircular loop 8a at the loading position; the border 9 surrounding the container mouth becomes engaged between the guides 8 and 8a and a slide 8b is also provided, of which the terminal part 8bb projecting beyond the upper plate 12 is bent vertically downwards. The seal closing the container mouth is removed while the container is held with its mouth pointing upwards; the container is then inclined until its mouth comes to bear against bee vertical part 8bb of the slide 8b, thereby preventing the pods from dropping out of the container, the container 6 is then pushed along the slide 8b between the guides 8 as far as the loading position shown in the figure.

Taken, together, FIGS. 2, 3A and 3B illustrate manual means for transferring into an extraction chamber the bottommost pod contained in a container.

Hinged on a vertical pin 15 projecting from the upper face of the intermediate plate 13 there are mounted, one above the other, the following three organs that in the figures are shown in their rest positions:

a first arm 16 that cares on its free end a cup 17 in which there can slide in the vertical direction a closing organ or plug 18 that at its lower end is provided with a cylindrical stem 19 that extends downwards through a central hole in the cup 17;

a second positioning arm 20 that on the right-hand side of its free end is provided with a concavity 21 corresponding to the convexity of the pods that are to be handled by the system;

a control lever 10 that finds itself engaged under the positioning arm 20, projects from the perimeter of the intermediate plate in such a way as to permit its being gripped by the operator and is connected to the positioning arm 20 by means of a pin 22 in the vicinity of the pin 15.

The container 6 is in the loading position on the plate 12, engaged in the guide 8, and directly above the plug 18. In addition to the three organs 16, 20, 10 the intermediate plate 13 is also provided with: an arcuate slot 23 in which there can slide the stem 19 of the plug 18 when the arm 16 is made to rotate about the pin 15; a buffer pin 24 to bring the positioning arm 20 to a halt in its right-hand rest position, i.e.

when it bears against the filter 28 into which the pod (not shown in the figure) has to be inserted; a helicoidal spring 25 that has one end fixed to the control lever 10 and the other end fixed to the arm 16, which provides a return force for the control lever and brings the plug 18 into the closure position and therefore the positioning arm 20 into its rest position (obviously, however, the control lever 10 can also be manually returned to its rest position); an opening 26 into which the pod is dropped after it has been used; an opening 27 to receive the lower part of the extraction chamber 3 that carries its filter 28 substantially at the level of the intermediate plate 13; an unblocking means 29 capable of sliding vertically between two guides not shown in the figure and kept in contact with the intermediate plate 13 by means of a spring clip 30, the said means having an upper end that extends through an opening in the intermediate plate 13 and thus comes to be situated just below the control lever 10 in its rest position, while its lower end extends to form an arm 32 that inclines towards the stem 19 of the plug 18; at the end of the arm 32 there is an organ with an oscillating hook 31 that can become engaged with a cavity 33 of the stem 19. The upper part of the extraction chamber 3 is controlled in an up and down movement in the direction of the arrow F, so that it can become closed after a pod has been inserted and then open again after the coffee has percolated.

The parts 10, 29, 30, 31, 32 intervene to implement the various phases of the manual transfer of the pods, one after the other, from the container 6 to the filter 28 and, more particularly, the removal of the plug 18 from the mouth of the container, the movement of the plug away from the loading position, towards the left, the dropping of the pod 34 onto the intermediate plate 13, the engagement of the concave part 21 of the positioning arm 20 with the left-hand side of the pod, the pushing of the positioning arm 20 by means of the control lever 10, and the pushing of the pod from its loading position on the intermediate plate 13 to the filter 28 by means of the positioning arm 20. When a pod 34 has to be transferred from the container 6 to the filter 28, the operator lowers the control lever 10 and then, overcoming the resistance of the spring clip 30, causes the lowering of the unblocking means 29 with its arm 31 and oscillating hook 32, which in its causes the plug 18 at the bottom of the cup 17 to be dragged downwards, so that the upper end of the plug will eventually come to be situated below the level of the upper plate 12 (see FIG. 3B); at this point the operator pushes the control lever 10 towards the left so that the arm 16 and the positioning arm 20 will, respectively, be pushed and dragged until the stem 19 is brought to a halt by the left-hand end of the arcuate slot 23 and the positioning arm comes to be situated to the left of the loading position; at this point, moreover, the pod 34 drops onto the intermediate plate 13 with its left-hand side in contact with the concavity 21 of the positioning arm 20. If the operator now pushes the control lever 10 towards the right, the said lever will drag the arm 16 with its cup 17 until it eventually comes up against he oscillating hook 32 and thus comes to rest in the loading position in which the cup 18 is pushed by the spring clip 30, acting through the part 29 and 31, into the mouth of the container, while the lever 10 continues its rightward motion to push the positioning lever 20 against the buffer pin 24, position in which the pod 34 is inserted into the filter. The control lever 10 and the positioning arm 20 are then brought back into their rest positions. When all the pods in the container 6 have been used, an operator will have to remove it and put a fill container in its place; before he can remove the empty container, the operator will have to move the plug 18 out of the container mouth by lowering the control lever 10 just enough to obtain this result.

Summarizing, the first operation that will generally have to be performed to activate the system is that of opening the little door that protects the space in which the coffee cup is placed to make it stand beneath the spout through which the coffee leaves the machine. While this door is open, a first buffer pin prevents the command that activates the means for picking up and positioning the pod. After the cup has been placed in this space and the door has been closed again, the first buffer pin is displaced, so that the control lever can first be pushed downwards and then moved sideways. This operation causes the mobile closure means or plug to be removed from the container mouth and subsequently to be pushed to the side and away from the loading position, whereby the positioning arm is likewise dragged to the side and away from the loading position, thus permitting a pod to drop from the container onto the intermediate plate by the side of the said lever. After this sideways movement has brought it into its extreme lateral position, the control lever is pushed in the opposite direction, so that it will come to push the positioning arm that carries the said pod into the extraction chamber. During this second sideways movement of the control lever the plug is brought back into its initial position to close the container mouth and to remain in its closure position flanks to the action of an organ that exerts an upward pressure on it. When the control lever has attained its extreme position against a buffer pin as a result of this second movement; so that that pod has been inserted in the extraction chamber, the control lever will perform a third sideways movement that brings it back into the loading position. Appropriate mechanical or electromechanical means will prevent the protection door from being opened while the control lever is being operated. On completion of the said third movement, the return of the control lever into the loading position operates an electric switch that will cause the ex on chamber to close and and brings the pump into action, thus triggering the percolation of the coffee. When the extraction has been completed, the extraction chamber is opened again, after which the protection door can be opened to remove the cup of coffee. When this door is opened, its rotation through the first 20° also brings into action—through an appropriate lever system—a conventional means capable of removing the exhausted pod from the extraction chamber and causing it to drop into an appropriate collection receptacle. When the control lever is returned into the loading position (third movement) and the percolation has been terminated it becomes possible to perform a new coffee extraction cycle. When the protection doors is open, the filter holder can be extracted to clean the filter and the funnel.

The manual mechanism illustrated by FIGS. 2, 3A and 3B may be replaced by an automatic mechanism as indicated in FIG. 4 and the operating sequence of FIGS. 4/1 to 4/9. This mechanism is controlled by an electronic circuit board that activates four different pusher means (hereinafter to be referred to more simply as 'pushers') to implement the phases that, following the removal of the seal that closes the container mouth and the manual phase of attaching the latter to the machine, range from the opening of the plug to the expulsion of the exhausted pod and the return of the machine to the position in which a new operating sequence can be commenced The pushers can be of the electromechanical, hydraulic or oil-pressure type. The reference numbers shown in FIG. 4 comprise all the parts described in the operating sequence of FIGS. 4/1 to 4/9 so that the discussion of the latter can be kept very brief.

FIG. 4 shows a container 6 attached to a coffee machine by means of the engagement of its radial border 9 in the guides 8–8a in the loading position adjacent to the extraction chamber 3; the lowermost pod 34 rest on the plug 18, where the up and down motion of the plug stem is controlled by a positioning means P1 in the form of a hydraulic cylinder that, just like the other positioning means P2, P3, P4 of the mechanism, is controlled by an electric circuit board not shown in the figure to push a relevant mechanical organ (which in the case of P1 is the plug 18) into a desired position and subsequently to bring it back from that position; arranged between the plates 12 and 13 there is a separation blade 50 to separate the pod resting on the plug 18 from the pods above it, where the said blade is attached to the shaft 51 capable of performing a horizontal motion under the control of a positioning means P2 to push the pod resting on the plug 18 into the filter 28; a positioning means P3 controls the vertical movement of the mobile upper part of the extraction chamber 3; a positioning means P4 controls the horizontal movement of a plate 53 that has the task of removing the exhausted pod from the filter 28, as will subsequently be illustrated by reference to FIG. 5. It will readily be understood that the said positioning means could be electromechanical, hydraulic or pneumatic.

FIG. 4/1 shows a container 6 already engaged in the guides 8, but not yet in the loading position;

FIG. 4/2 substantially reproduces the situation illustrated by FIG. 4: the container 6 is in the loading position and the machine has not yet received the command to commence an operating cycle;

FIG. 4/3 shows the phase in which, after the operator has pressed an 'ON' button (not shown in the figure) to commence the operation, the positioning means P1 receives a pulse that causes the lowering of the plug 18 and the descent of the pods within the container to the point where the bottommost pod 34 comes to be situated in front of the shaft 51;

FIG. 4/4 shows the phase in which the positioning means P2 receives a pulse that causes the shaft 5 to move to the right until the pod 34 comes to be situated in the filter 28 and the separation blade 50 comes to be situated between the said pod and the shaft 51;

FIG. 4/5 shows the phase in which the positioning means P2 receives a pulse that causes the shaft 51 and the blade 50 to move back to the left;

FIG. 4/6 shows the phase in which the positioning means P1 receives a pulse that causes the plug 18 to rise until it again closes the mouth of the container;

FIG. 4/7 shows the phase in which the positioning means P3 receives a pulse that causes the long of the upper part of the extraction chamber 3, which thus comes to bear against the lower part of the chamber with the pod 34 enclosed between the said upper and lower part;

FIG. 4/8 shows the phase in which the positioning means P3 receives a pulse that causes the upper part of the extraction chamber 3 to rise upwards, thus uncovering the exhausted pod 34;

FIG. 4/9 shows the phase in which the positioning means P4 receives a pulse that causes the plate 53 to move horizontally, sliding in contact with the anterior edge of the filter 28, to push the exhausted pod out of the extraction chamber.

Following the sequence that has just been illustrated, the machine is ready to repeat a further sequence upon receiving a new command from the 'ON' button and so on.

FIG. 5 further clarifies the phase illustrated by FIG. 4/9: the exhausted pod 34 rests with its edge 34a on the filter 28 and the pulse received by the positioning means P4 causes the plate 53 to move forward in the direction of the arrow F; the plate thus penetrates between the anterior edge of the filter and the edge of the pod, which is thus raised and pushed into the opening 26 provided in the intermediate plate 13, so that it can drop into a receptacle placed beneath it (but not shown in the figure); the plug 18, the positioning means P2, the separation blade 50 and the shaft 51 can also be seen in the figure.

FIG. 6 shows that the positioning means that carries a pod into the extraction chamber is an endless conveyer belt 40 revolving in a clockwise direction F over two opposite drums, one of which is driven, operating between the loading position and the filter 28, where the said belt is provided with equally spaced openings 42, each of which can receive a pod 34 when a controlled movement brings each of the said openings, step by step, under the container 6 and under a separation blade 41 capable of moving in the direction of the arrow F1. Each pod settles into an opening of the belt 40, being sustained there by its edge 34a. When the machine is activated to make coffee, the blade 41 is withdrawn from the position in which it closes the mouth of the container 6, thus permitting a pod to drop into the opening of the belt 40 beneath it and immediately afterwards the belt 40 set in motion and then brought to rest again after a the pod has been inserted in the filter 28 of the extraction chamber 3; as soon as the belt has moved, the separation blade 41 is brought back into the closure position shown in the figure, after which a programmed command causes the mobile upper part of the extraction chamber to be lowered onto the fixed lower part 33 of the chamber and activates the percolation of the coffee; on completion of the percolation the upper part of the extraction chamber returns into its raised position and the belt resumes its forward motion to let the exhausted pod to drop into the tank 44 when the belt reverses at the end of its run. The belt also comprises appropriately spaced openings 42A that permit the coffee to pass through it on its way to the delivery spout of the machine.

Alternatively, each of the openings 42 can carry a filter 28 to replace the filter permanently housed in the lower part of the extraction chamber 3; this solution offers the advantage of providing additional protection for the pod during the time that elapses between the moment when the pod drops onto the belt 40 and the moment it enters the extraction chamber. The problem of the passage of the filter over the drums D is solved in various ways, cases in point being a concave conformation of the surface of the drums or using a flexible material for the construction of the filters.

FIG. 7 shows a group of containers 6 equally spaced along the periphery of a disc 45 rotating in the direction of the arrow F2 around the central axis 46 of a fixed platform 47, the said containers, each of which contains a load of pods stacked one on top of the other, deprived of the hermetic closure elements that closed their mouths, being engaged with their own engagement means 9 in corresponding receiving means 8 provided on the rotating disc, so that, one after the other, they are brought by means of a controlled movement into a loading position 48 adjacent to the extraction chamber, where there is situated the retractable plug 18, which can be controlled by means of a mechanism as described with reference to FIGS. 2, 3A, 3B or 4 to transfer a pod into the extraction chamber. With a view to rendering the drawing more readily comprehensible, the container situated in the loading position has not been shown in the figure.

FIG. 8 shows an alternative to the solution described in FIG. 7; a linear support 45a can be moved, step by step and under the action of a controlled pushing means (not shown in the figure), in the direction of the arrow F3 along a guide 54 fixed on the upper plate 12 of the coffee machine; the support can carry five containers 6 (though only two are actually shown in the figure) in the five seatings 60 (receiving means 8 are provided in each of the five seatings to receive the engagement means 9 of the containers); the container brought to a halt above the retractable plug 18 in the loading position 48a adjacent to the extraction chamber 3 furnishes one pod after the other with the previously described means until it becomes emptied; at this point the pushing means causes the support 45a to move forward by one step, thus bringing the next container into the loading position, and so on. When all the containers have become emptied, they are manually removed and replaced by full containers that have been deprived of the hermetic closure elements that closed their mouths. With a view to rendering the drawing more readily comprehensible, the container situated in the loading position has not been shown in the figure.

The invention claimed is:

1. System for transferring individual coffee packages (34) from a container to the extraction chamber (3) of a machine for making espresso coffee, the individual coffee packages being stacked one on the top of the other into a tubular container (6) and the system comprising means below the container for realizing said transfer, a water source for making the coffee infusion, a heater for bringing the water up to the desired temperature, a pump for pumping the water into the extraction chamber, operating means for activating the machine, controlling the extraction chamber made up of a fixed lower part into which there is received a coffee package and a mobile upper part that can close onto and open from the coffee package, as well as means for controlling the functions of the machine, the said system being characterized in that:

the container (6) is provided with a closure means (S) which seals the mouth thereof and is provided with engagement means (9) suitable for engaging receiving means (7, 8) in the coffee machine as the closure means (5) is removed from the container, the receiving means being associated with the coffee machine in a loading position adjacent to the extraction chamber (3), a mobile closure means (18) is associated with the machine to perform controlled displacements from a position in which the container mouth is closed to a position in which the container mouth is open to let a coffee package (34) drop out of the container (6), an opening in the machine at the loading position permits the bottommost coffee package to pass from the container (6) to transfer means (10, 16, 20) beneath it when the mobile closure means (18) is in the open position;

the transfer means (10, 16, 20) are suitable for displacing the mobile closure means (18) from the closure position and carrying the coffee package (34) from the loading position to the extraction chamber (3);

control means activate in sequence the aforesaid mobile closure means (18), the transfer means and means for performing the phases of closing the extraction chamber after the coffee package has been transferred into it, the return of the said mobile closure means (18) into a rest position, the pump that pumps the water to the heater and the extraction chamber, the percolation of the coffee, the opening of the extraction chamber (3), the expulsion of the exhausted coffee package so that the system may be ready to operate, when so commanded by a user, on the next coffee package released by the container, wherein, the receiving means (7, 8) is an adapter element independent from the machine and carries means (7c) suitable for receiving the engagement means (9) of the container (6) before the adapter is fixed to the machine in the loading position.

2. A system in accordance with claim 1, characterized in that the container (6) is engaged on a support area (8b) between receiving means in the form of two parallel guides (8) in the loading position adjacent to the extraction chamber, the support area (8b) being fixed to the machine and carrying upstream of the guides (8) a part (8bb) that is bent vertically downwards and serves as a slide at the moment of loading the container (6) in the machine.

3. A system in accordance with claim 1, characterized in that the transfer means (10, 16, 20) are hinged on one and the same pin (15) projecting from the upper face of the intermediate plate (13) and, in their rest position, are defined as:

a first arm (16) that carries at its free end a cup (17) in which vertical movements can be performed by a closure means (18) that comprises on its underside a stem (19) extending through a central hole of the cup (17);

a second positioning arm (20) that carries on one side of its free end a concavity (21) corresponding to the convexity of the coffee package to be processed in the system;

a control lever (10) that is situated at a level below that of the positioning arm (20), projects beyond the perimeter of the intermediate plate (13) to permit its being gripped and is connected to the positioning arm (20) by means of a pin (22) adjacent to the said vertical pin (15);

the said means being associated with:

an arcuate slot (23) formed in the intermediate plate (13) in which there can slide the stem (19) of the closure means (18) when the arm (16) is made to rotate about the pin (15);

a buffer pin (24) to bring the positioning arm (20) to a halt in its stopping position against the filter into which the coffee package is to be inserted;

a helicoidal spring (25) that has one of its ends fixed to the control lever (10) and the other end fixed to the intermediate plate (13) so as to exert a return force on the control lever and therefore on the positioning arm and bring the closure means (18) back into its closure position.

4. A system in accordance with claim 1, characterized in that the mobile closure means, the transfer means and the control means that perform the sequence of phases from the opening of the closure means right through to the expulsion of the exhausted coffee package and the return of the machine into the condition in which it is ready to commence a new sequence of operations are controlled by an electronic circuit board that activates a group of positioning means (P1, P2, P3, P4) so that respectively:

P1 may receive a first pulse that causes the lowering of the closure means (18) and the descent of the coffee packages (34) along the container in such a way as to bring the bottommost coffee package (34) into a position in front of a movable shaft (51);

P2 may receive a first pulse that causes the movable shaft (51) to move towards the right until the bottommost coffee package becomes positioned within the filter (28) and a separation blade (50) becomes positioned between the bottommost coffee package and the one above it and P2 may receive a second pulse that causes the movable shaft (51) and the separation blade (50) to move towards the left;

P1 may receive a second pulse that causes the closure means (18) to rise and close the container mouth;

P3 may receive a first pulse that causes the lowering of the upper part of the extraction chamber (3) and then receive a second pulse that causes the rising of the upper part of the extraction chamber (3) after the percolation of a cup of coffee to leave the exhausted coffee package (34) uncovered;

P4 may receive a first pulse that causes a plate (53) to move horizontally, sliding in contact with the anterior edge of the filter (28), to push the exhausted coffee package out of the extraction chamber and then receive a second pulse that causes the plate (53) to return to its rest position.

5. A system in accordance with claim 1, characterized in that the positioning means is an endless belt (40) revolving from the loading position to the extraction chamber (3) and provided with a large number of equally spaced openings (42) each of which may receive a coffee package (34) when a controlled movement brings each of the said openings, step by step, under the container (6) and under a closure means in the form of a mobile blade (41) and that when the machine is activated to make coffee, the mobile blade (41) is withdrawn from the position in which it closes the mouth of the container (6) and permits a coffee package to drop into the opening of the belt (40) beneath it, the belt being immediately afterwards set in motion and then brought to rest again after the coffee package has been inserted in the extraction chamber (3), and that as soon as the belt has moved, the mobile blade (41) is brought back into the closure position, the belt (40) being provided with opening (42A) that permit the coffee to pass into the cup (5).

6. A system in accordance with claim 5, characterized in that each opening (42) in the belt (40) carries a filter (28) that replaces the filter permanently housed in the lower part of the extraction chamber (3).

7. System for transferring individual coffee packages (34) from a container to the extraction chamber (3) of a machine for making espresso coffee, the individual coffee packages being stacked one on the top of the other into a tubular container (6) and the system comprising means below the container for realizing said transfer, a water source for making the coffee infusion, a heater for bringing the water up to the desired temperature, a pump for pumping the water into the extraction chamber, operating means for activating the machine, controlling the extraction chamber made up of a fixed lower part into which there is received a coffee package and a mobile upper part that can close onto and open from the coffee package, as well as means for controlling the functions of the machine, the system being characterized in that:

the container (6) is provided with a closure means (S) which seals the mouth thereof and is provided with engagement means (9) suitable for engaging receiving means (7, 8) in the coffee machine as the closure means (S) is removed from the container, the receiving means being associated with the coffee machine in a loading position adjacent to the extraction chamber (3);

a mobile closure means (18) is associated with the machine to perform controlled displacements from a position in which the container mouth is closed to a position in which the container mouth is open to let a coffee package (34) drop out of the container (6);

an opening in the machine at the loading position permits the bottommost coffee package to pass from the container (6) to transfer means (10, 16, 20) beneath it when the mobile closure means (18) is in the open position;

the transfer means (10, 16, 20) are suitable for displacing the mobile closure means (18) from the closure position and carrying the coffee package (34) from the loading position to the extraction chamber (3);

control means activate in sequence the aforesaid mobile closure means (18), the transfer means and means for performing the phases of closing the extraction chamber after the coffee package has been transferred into it, the return of said mobile closure means (18) into a rest position, the pump that pumps the water to the heater and the extraction chamber, the percolation of the coffee, the opening of the extraction chamber (3), the expulsion of the exhausted coffee package so that the system may be ready to operate, when so commanded by a user, on the next coffee package released by the container; and equally spaced along the periphery of a rotating disc or along a linear support mounted on the coffee machine, a group of containers (6) engaged with their own engagement means (9) in receiving means (8) of the rotating disc or linear support to be brought, one after the other and by means of a controlled movement, into a loading position (48) adjacent to the extraction chamber, where there is situated the closure means (18) that, together with the opening, closure and transfer means, are operated to perform the phases from the opening of the closure means right through to the expulsion of the exhausted coffee package and the return of the machine into the condition in which it is ready to commence a new operating cycle.

8. System for transferring individual coffee packages (34) from a container to the extraction chamber (3) of a machine for making espresso coffee, the individual coffee packages being stacked one on the top of the other into a tubular container (6) and the system comprising means below the container for realizing said transfer, a water source for making the coffee infusion, a heater for bringing the water up to the desired temperature, a pump for pumping the water into the extraction chamber, operating means for activating the machine, controlling the extraction chamber made up of a fixed lower part into which there is received a coffee package and a mobile upper part that can close onto and open from the coffee package, as well as means for controlling the functions of the machine, the system comprising:

the container (6) provided with a closure means (S) which seals a container mouth of the container and is provided with engagement means (9) to engage receiving means (7, 8) in the coffee machine as the closure means (S) is removed from the container, the receiving means being associated with the coffee machine in a loading position adjacent to the extraction chamber (3);

an opening in the machine at the loading position permitting the bottommost coffee package to pass from the container (6) to transfer means (10, 16, 20) beneath the opening when a mobile closure means (18) is in the open position, the transfer means (10, 16, 20) suitable for displacing the mobile closure means (18) from the closure position and carrying the coffee package (34) from the loading position to the extraction chamber (3); and control means which activate in sequence the mobile closure means (18), the transfer means and means for performing the phases of closing the extraction chamber after the coffee package has been transferred into the extraction chamber, the return of said mobile closure means (18) into a rest position, the pump that pumps the water to the heater and the extraction chamber, the percolation of the coffee, the opening of the extraction chamber (3), the expulsion of the exhausted coffee package so that the system may be ready to operate, when so commanded by a user, on the next coffee package released by the container, wherein said mobile closure means (18) in the machine performs controlled displacements from a position in which the container mouth is open to another position in which the container mouth is closed so that a coffee package (34) may drop out of the container (6) and the container becomes closed again immediately afterwards.

9. A system in accordance with claim 8, characterized in that the receiving means (7, 8) is an adapter element independent from the machine and carries means (7*c*) suitable for receiving the engagement means (9) of the container (6) before the adapter is fixed to the machine in the loading position.

10. A system in accordance with claim 8, characterized in that the container (6) is engaged on a support area (8*b*) between receiving means in the form of two parallel guides (8) in the loading position adjacent to the extraction chamber, the support area (8*b*) being fixed to the machine and carrying upstream of the guides (8) a part (8*bb*) that is bent vertically downwards and serves as a slide at the moment of loading the container (6) in the machine.

11. A system in accordance with claim 8, characterized in that the transfer means (10, 16, 20) are hinged on one and the same pin (15) projecting from the upper face of the intermediate plate (13) and, in their rest position, are defined as:
- a first arm (16) that carries at its free end a cup (17) in which vertical movements can be performed by a closure means (18) that comprises on its underside a stem (19) extending through a central hole of the cup (17);
- a second positioning arm (20) that carries on one side of its free end a concavity (21) corresponding to the convexity of the coffee package to be processed in the system;
- a control lever (10) that is situated at a level below that of the positioning arm (20), projects beyond the perimeter of the intermediate plate (13) to permit its being gripped and is connected to the positioning arm (20) by means of a pin (22) adjacent to the said vertical pin (15);

said means being associated with:
- an arcuate slot (23) formed in the intermediate plate (13) in which there can slide the stem (19) of the closure means (18) when the arm (16) is made to rotate about the pin (15);
- a buffer pin (24) to bring the positioning arm (20) to a halt in its stopping position against the filter into which the coffee package is to be inserted;
- a helicoidal spring (25) that has one of its ends fixed to the control lever (10) and the other end fixed to the intermediate plate (13) so as to exert a return force on the control lever and therefore on the positioning arm and bring the closure means (18) back into its closure position.

12. A system in accordance with claim 8, characterized in that the mobile closure means, the transfer means and the control means that perform the sequence of phases from the opening of the closure means right through to the expulsion of the exhausted coffee package and the return of the machine into the condition in which it is ready to commence a new sequence of operations are controlled by an electronic circuit board that activates a group of positioning means (P1, P2, P3, P4) so that respectively:

P1 may receive a first pulse that causes the lowering of the closure means (18) and the descent of the coffee packages (34) along the container in such a way as to bring the bottommost coffee package (34) into a position in front of a movable shaft (51);

P2 may receive a first pulse that causes the movable shaft (51) to move towards the right until the bottommost coffee package becomes positioned within the filter (28) and a separation blade (50) becomes positioned between the bottommost coffee package and the one above it and P2 may receive a second pulse that causes the movable shaft (51) and the separation blade (50) to move towards the left;

P1 may receive a second pulse that causes the closure means (18) to rise and close the container mouth;

P3 may receive a first pulse that causes the lowering of the upper part of the extraction chamber (3) and then receive a second pulse that causes the rising of the upper part of the extraction chamber (3) after the percolation of a cup of coffee to leave the exhausted coffee package (34) uncovered;

P4 may receive a first pulse that causes a plate (53) to move horizontally, sliding in contact with the anterior edge of the filter (28), to push the exhausted coffee package out of the extraction chamber and then receive a second pulse that causes the plate (53) to return to its rest position.

13. A system in accordance with claim 8, characterized in that the positioning means is an endless belt (40) revolving from the loading position to the extraction chamber (3) and provided with a large number of equally spaced openings (42) each of which may receive a coffee package (34) when a controlled movement brings each of the openings, step by step, under the container (6) and under a closure means in the form of a mobile blade (41) and that when the machine is activated to make coffee, the mobile blade (41) is withdrawn from the position in which it closes the mouth of the container (6) and permits a coffee package to drop into the opening of the belt (40) beneath it, the belt being immediately afterwards set in motion and then brought to rest again after the coffee package has been inserted in the extraction chamber (3), and that as soon as the belt has moved, the mobile blade (41) is brought back into the closure position, the belt (40) being provided with opening (42A) that permit the coffee to pass into the cup (5).

14. A system in accordance with claim 13, characterized in that each opening (42) in the belt (40) carries a filter (28) that replaces the filter permanently housed in the lower part of the extraction chamber (3).

15. A system in accordance with claim 8, characterized in that it comprises, equally spaced along the periphery of a rotating disc or along a linear support mounted on the coffee machine, a group of containers (6) engaged with their own engagement means (9) in receiving means (8) of the rotating disc or linear support to be brought, one after the other and by means of a controlled movement, into a loading position (48) adjacent to the extraction chamber, where there is situated the closure means (18) that, together with the opening, closure and transfer means, are operated to perform the phases from the opening of the closure means right through to the expulsion of the exhausted coffee package and the return of the machine into the condition in which it is ready to commence a new operating cycle.

* * * * *